(12) United States Patent
Sollich

(10) Patent No.: US 9,274,772 B2
(45) Date of Patent: Mar. 1, 2016

(54) COMPACT TYPE LAYOUTS

(75) Inventor: Peter Franz Valentin Sollich, Munich (DE)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 13/572,700

(22) Filed: Aug. 13, 2012

(65) Prior Publication Data

US 2014/0046984 A1    Feb. 13, 2014

(51) Int. Cl.
| | |
|---|---|
| G06F 7/00 | (2006.01) |
| G06F 17/30 | (2006.01) |
| G06F 9/45 | (2006.01) |
| G06F 9/455 | (2006.01) |

(52) U.S. Cl.
CPC ............ *G06F 8/4434* (2013.01); *G06F 8/4441* (2013.01); *G06F 9/45504* (2013.01)

(58) Field of Classification Search
USPC ......... 707/803, 106, 118, 121, 130, 136, 140, 707/145
See application file for complete search history.

(56) References Cited

U.S. PATENT DOCUMENTS

| | | | |
|---|---|---|---|
| 5,297,284 A | 3/1994 | Jones et al. | |
| 6,463,579 B1 | 10/2002 | McKinsey | |
| 6,957,416 B2 | 10/2005 | Adams | |
| 7,155,703 B2 | 12/2006 | Meijer et al. | |
| 7,162,626 B2 | 1/2007 | Zimmer et al. | |
| 7,171,655 B2 | 1/2007 | Gordon et al. | |
| 7,219,329 B2 | 5/2007 | Meijer et al. | |
| 7,281,248 B2 | 10/2007 | Demsey et al. | |
| 7,516,449 B2 | 4/2009 | Agrawal | |
| 7,526,760 B1 | 4/2009 | Daynes et al. | |
| 7,546,607 B2 | 6/2009 | Demsey et al. | |
| 7,571,425 B2 | 8/2009 | Lessly | |
| 7,574,699 B1 * | 8/2009 | Simmons et al. | 717/136 |
| 7,600,223 B2 | 10/2009 | Massarenti et al. | |
| 7,627,863 B2 | 12/2009 | Chen | |
| 7,685,581 B2 | 3/2010 | Plesko et al. | |
| 7,707,547 B2 * | 4/2010 | Colton et al. | 717/118 |
| 7,711,695 B2 | 5/2010 | Pingte et al. | |

(Continued)

OTHER PUBLICATIONS

Barnes, Denise, "Fundamentals of Microsoft .NET Compact Framework Development for the Microsoft .NET Framework Developer", Retrieved at <<http://msdn.microsoft.com/en-us/library/aa446549.aspx>>, Dec. 2003, pp. 15.

(Continued)

*Primary Examiner* — Syed H Hasan
*Assistant Examiner* — Nicholas Allen
(74) *Attorney, Agent, or Firm* — Kevin Sullivan; Kate Drakos; Micky Minhas

(57) ABSTRACT

A precompiled form of information derived from CIL metadata is created in a compact type layout (CTL) format. Information in CTL format for each data type in a program can be represented as a contiguous byte stream. Information that is irrelevant to decisions concerning layout of a data type in memory can be suppressed. information that is irrelevant to creation of virtual machine data structures can be suppressed. The information in CTL format may reference types, methods, and fields by CIL metadata token. Virtual override information such as, for example, a logical virtual table layout, can be pre-computed. Interface implementation information can be pre-computed. A decoder can generate data structures used in generation of an executable from the CTL formatted data.

41 Claims, 4 Drawing Sheets

(56) References Cited

U.S. PATENT DOCUMENTS

| | | | |
|---|---|---|---|
| 7,844,958 B2* | 11/2010 | Colton et al. | 717/146 |
| 8,266,609 B2 | 9/2012 | Harris | |
| 8,271,939 B1* | 9/2012 | Krishnaiyer | G06F 8/33 707/795 |
| 8,321,849 B2 | 11/2012 | Nickolls et al. | |
| 2002/0026633 A1 | 2/2002 | Koizumi et al. | |
| 2002/0108107 A1 | 8/2002 | Darnell et al. | |
| 2002/0170042 A1 | 11/2002 | Do et al. | |
| 2003/0154468 A1 | 8/2003 | Gordon et al. | |
| 2004/0025151 A1 | 2/2004 | Ku | |
| 2004/0221282 A1 | 11/2004 | Le Metayer et al. | |
| 2004/0268331 A1 | 12/2004 | Mitchell et al. | |
| 2005/0055680 A1 | 3/2005 | Kluger et al. | |
| 2005/0060695 A1 | 3/2005 | Hostetter et al. | |
| 2005/0071616 A1* | 3/2005 | Zimmer et al. | 713/1 |
| 2005/0114771 A1* | 5/2005 | Piehler et al. | 715/536 |
| 2006/0101468 A1 | 5/2006 | Massarenti et al. | |
| 2006/0212861 A1 | 9/2006 | Tarditi et al. | |
| 2006/0230070 A1* | 10/2006 | Colton et al. | 707/104.1 |
| 2007/0157191 A1 | 7/2007 | Seeger et al. | |
| 2007/0288910 A1* | 12/2007 | Bhat et al. | 717/140 |
| 2008/0244541 A1 | 10/2008 | Thomson et al. | |
| 2008/0295083 A1 | 11/2008 | Meijer et al. | |
| 2009/0049431 A1 | 2/2009 | Wang et al. | |
| 2009/0328017 A1 | 12/2009 | Larsen et al. | |
| 2010/0083238 A1 | 4/2010 | Barnett et al. | |
| 2010/0088669 A1 | 4/2010 | Cwalina et al. | |
| 2010/0262952 A1* | 10/2010 | Colton et al. | 717/118 |
| 2010/0269103 A1 | 10/2010 | Wu et al. | |
| 2011/0131548 A1* | 6/2011 | Colton et al. | 717/106 |
| 2011/0131561 A1* | 6/2011 | Adams et al. | 717/159 |
| 2011/0258615 A1 | 10/2011 | Sollich | |
| 2011/0258616 A1* | 10/2011 | Sollich | 717/146 |
| 2011/0283263 A1* | 11/2011 | Gagliardi et al. | 717/130 |
| 2012/0085818 A1* | 4/2012 | Williams | 235/375 |
| 2012/0227034 A1* | 9/2012 | Ibarra et al. | 717/145 |
| 2013/0145349 A1* | 6/2013 | Basak et al. | 717/121 |

OTHER PUBLICATIONS

Mikunov, Aleksandr, "Rewrite MSIL Code on the Fly with the .NET Framework Profiling API", Retrieved at <<http://msdn.microsoft.com/en-us/magazine/cc188743.aspx>>, Sep. 2003, pp. 17.

Eisenbach, et al., "Reuse and Abuse", Retrieved at <<http://www.jot.fm/issues/issue_2007_01/article5/article5.pdf>>, Journal of Object Technology, vol. 6, No. 1, Jan.-Feb. 2007, pp. 29.

"3rd ECOOP Workshop on Formal Techniques for Java Programs", Retrieved at <<http://www.cs.ru.nl/ftfjp/2001/ftfjp01.pdf>>, ECOOP 2001 Workshop 4, Jun. 18, 2001, pp. 148.

Schaber, Gerhard, "Dynamic Ordered Inheritance and Flexible Method Dispatch", Retrieved at <<http://www.ssw.uni-linz.ac.at/Research/Papers/Scha03/Scha03.pdf>>, PhD thesis, Johannes Kepler University of Linz, Jul. 2003, pp. 207.

Bakota, et al., "Semi-Automatic Test Case Generation from Business Process Models", Retrieved at <<http://www.cs.tut.fi/~splst09/material/Proceedings%20of%20SPLST09%20and%20NWMODE09.pdf>>,Proceedings of 11th Symposium on Programming Languages and Software Tools and 7th Nordic Workshop on Model Driven Software Engineering, Aug. 2009, pp. 349.

Mikhajlov, et al. "A Study of the Fragile Base Class Problem", Retrieved at <<http://www.cas.mcmaster.ca/~emil/publications/fragile/ecoop98.pdf>>, Proceeding of the 12th European Conference on Object-Oriented Programming 1998, Jul. 1998, pp. 28.

"Fragile Base Class", Retrieved at <<http://en.wikipedia/org/wiki/Fragile_base_class,Retrieved Date: Feb. 16, 2010. pp. 2.

Gough, John, "Virtual Machines, Managed Code and Component Technology", Retrieved at <<http://ieeexplore.ieee.org/stamp/stamp.jsp?arnumber=01401995>>, Proceedings of the 2005 Australian Software Engineering Conference, 2005, pp. 8.

"MRTEs Add Both Functionality and Complexity", Retrieved at <<http://software.intel.com/en-us/articles/mrtes-add-both-functionality-and-complexity/>>, Retrieved Date: Feb. 22, 2010, pp. 4.

Chen, et al., "Java* JNI Bridge: A Framework for Mixed Native ISA Execution", Retrieved at <<http://ieeexplore.ieee.org/Stamp/stamp.jsp?tp=&arnumber=1611530>>, Proceedings of the International Symposium on Code Generation and Optimization, 2006, pp. 11.

Potrebic, Peter, "What's the Fragile Base Class (FBC) Problem?", Retrieved at <<http://2f.ru/holy-wars/fbc.html>>, Jun. 25, 1997, pp. 5.

"Fragile binary interface problem", Retrieved at <<http://en.wikipedia.org/wiki/Fragile_binary_interface_problem>>, Retrieve Date: Jan. 22, 2010, pp. 3.

"Software brittleness", Retrieved at <<http://en.wikipedia.org/wiki/Software_brittleness>>, Retrieve Date: Mar. 18, 2010, pp. 3.

N.B.H. Sombekke, "Graph-Based Semantics of the .NET Intermediate Language", University of Twente Faculty of Eleectrical Engineering, Mathematics and Computer Science, 2007, pp. 115.

Chen, et al., "Type-Preserving Compilation for Large-Scale Optimizing Object-Oriented Compilers", Retrieved at: http://research.microsoft.com/pubs/63653/pldi165-chen.pdf, Proceedings of the 2008 ACM SIGPLAN Conference on Program Design and Implementation, 2008, pp. 10.

Chen, et al., "A Simple Typed Intermediate Language for Object-Oriented Languages", Retrieved at: <<http://research.microsoft.com/pubs/59934/lilc_popl05.pdf>>, Proceedings of the 32nd ACM Symposium of Principles of Programming Languages, 2005, pp. 12.

Reig, Fermin, "Annotations for Portable Intermediate Languages", Retrieved at: <<http://www.elsevier.nl/locate/entcs/volume59.html, Electronic Notes in Theoretical Computer Science 59, No. 1, 2001, pp. 14.

Boquist, Urban, "Interprocedural Register Allocation for Lazy Functional Language", Retrieved at: <<http://citeseerx.ist.psu.edu/viewdoc/summary?doi=10.1.1.41.6525>>, Proceedings of the 1995 Conference on Functional Programming Languages and Computer Architecture, 1995, pp. 71.

Auslander, et al., "An Overview of the PL.8 Compiler", Retrieved at: <<http://www.bibsonomy.org/bibtex/270d78871aa3f76f13e3326217dfd4ddc/dblp>>, SIGPLAN Symposium of Compiler Construction, 1982, pp. 10.

\* cited by examiner

COMPACT TYPE LAYOUTS

BACKGROUND

The Common Intermediate Language (CIL) is a low-level human-readable programming language defined by the Common Language Infrastructure (CLI) specification. CIL is an object-oriented stack-based assembly language. Its byte code can be translated into native code or can be executed by a virtual machine.

Source code of a CLI programming language can be translated into CIL code instead of being translated into platform or processor specific object code, CIL is processor and platform independent so it can be executed in any environment supporting the Common Language Infrastructure, (e.g., Microsoft® .NET, Mono, etc.). The CIL is assembled into byte code. A CLI assembly comprising byte code and metadata can be created. When a CLI assembly is executed, the code can be just-in-time (JIT) compiled to generate native code which can be executed by the processor. As the program executes, JIT compilation converts the byte code into code that can be executed. HT compilation can provide environment-specific optimization, runtime type safety, and assembly verification by examining the assembly metadata for illegal accesses and handling any detected violations.

Data types are described by CIL metadata. CIL metadata typically takes up a lot of space and is hierarchical in nature. The CIL metadata is translated into runtime data structures such as method tables, method descriptors, field descriptors and so on. This translation typically takes a lot of computation. Moreover, the native code generated from the CIL involves values such as field offsets, virtual table slots etc., the generation of which are also computationally expensive.

SUMMARY

A lower-level, precompiled form of information about data types can be derived from CIL metadata. The information is created in a format referred to herein as the compact type layout (CTL) format. The information in CTL format derived from the CIL metadata takes up less space than does the CIL metadata. Information in CTL format for each data type can be represented as a contiguous byte stream. CTL data type information can be randomly accessed. The information in CTL format or portions thereof can be compressed. Information that is irrelevant to layout decisions can be suppressed (i.e., not included in (excluded from) the information in CTL format). Information that is irrelevant to creation of virtual machine data structures (including but not limited to name and signature information) can be suppressed (i.e., not included in (excluded from) the information in CTL format). The information in CTL format may reference types, methods, and fields by CIL metadata token. Virtual override information such as, for example, a logical virtual table layout, can be pre-computed. Interface implementation information can be pre-computed, This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
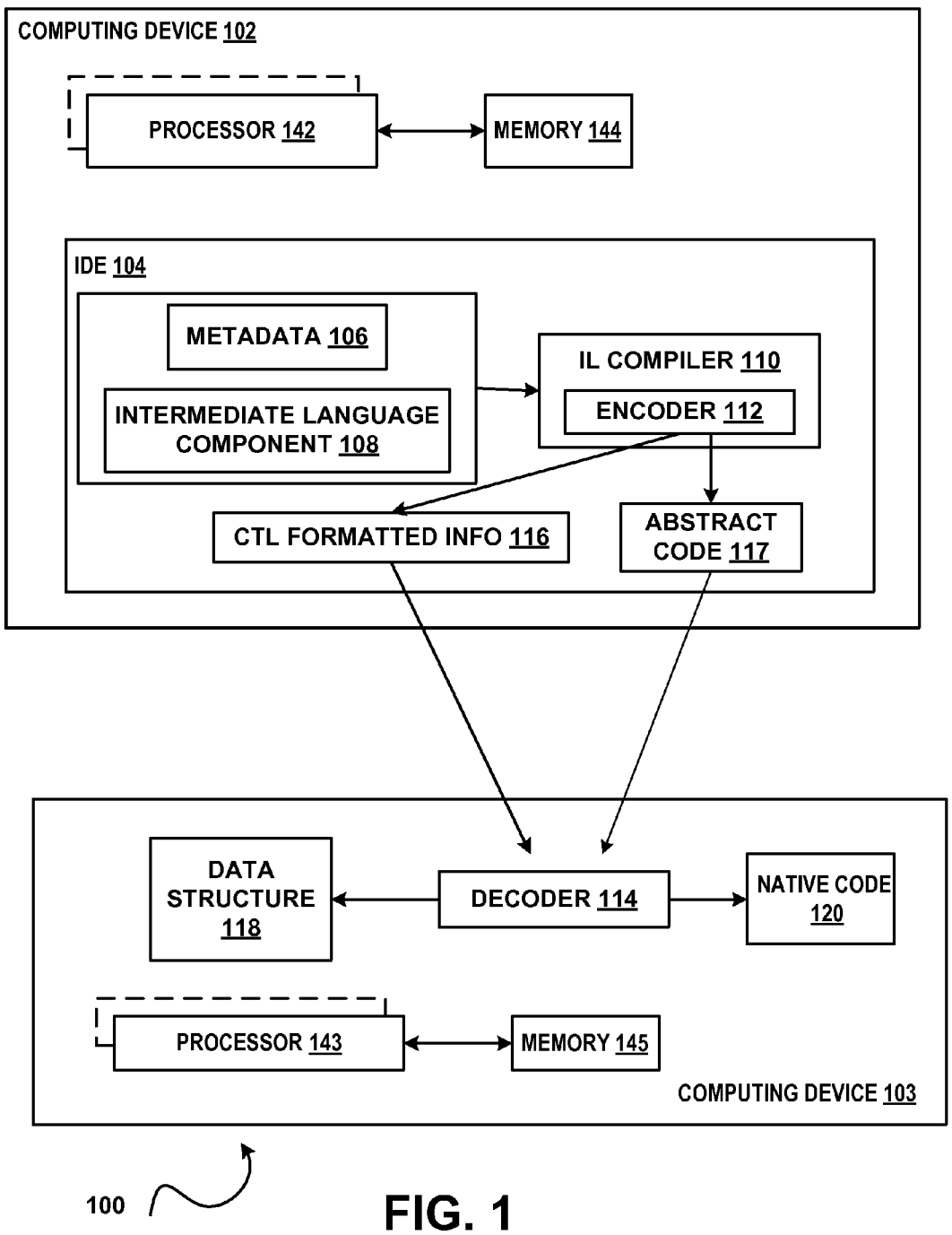
FIG. 1 illustrates an example of a system 100 that generates a contiguous stream of bytes in CTL format, the data representing data types as described herein in accordance with aspects of the subject matter described herein.

In an object oriented program one or more data types can be defined. Components of a particular data type can be defined in multiple modules. For example, a base type can be defined in a first module (e.g., Module A) and a derived type can be defined in a second module (e.g., Module B). Each data type can be associated with one or more fields that result in a particular field layout and size in memory for that data type. Each data type can be associated with a virtual table. Each derived data type can be associated with its own version of the virtual table. The virtual table is a table of pointers to functions or methods used to implement dynamic binding. At execution time, each instance of an object stores a pointer to a virtual table as part of its instance data.

Dynamic binding occurs when the appropriate code to invoke cannot be determined statically at compile-time and instead is determined dynamically at runtime. Traditionally, a virtual table is created by the compiler for each object of a class that contains one or more virtual methods. For example, suppose a class includes different implementations of the method foo( ). If the class of an object x is not known at compile-time, when x.foo( ) is called during execution of the program, the program has to determine then which implementation of foo( ) to invoke, based on the runtime type of object x.

In accordance with aspects of the subject matter described herein, a precompiled form of information derived from CIL metadata can be created in CTL format. Information relating to a data type can be organized into a single contiguous stream of data, enabling the data to be stored in a contiguous area of memory and enabling the information to be compressed. CTL information for a particular type can be read sequentially. CTL data type information can be randomly accessed. The information in CTL format or portions of the information CTL format can be compressed. Information that is irrelevant to layout decisions can be suppressed (i.e., not included in the information in CTL format). Information that is irrelevant to creation of virtual machine data structures (including but not limited to name and signature information) can be suppressed (i.e., not included in the information in CTL format). The information in CTL format may reference types, methods, and fields by CIL metadata token. Virtual override information such as, for example, a logical virtual table layout, can be pre-computed. Interface implementation information can be pre-computed. Information associated with identification of the information being encoded can be separate from the actual information. That is, the logical information to be encoded for a construct can be separate from the compact encoding of the actual information.

The information in CTL format described herein can include one byte opcodes (operation codes) referred to herein as "CTL tags". A CTL tag can be followed by additional information associated with that particular opcode. Various compression algorithms can be used to represent signed and unsigned number and metadata tokens compactly. CTL opcodes include but are not limited to:

CLT_START_TYPE <base type token>, <enclosing type token>, <interface count>, <method count>, <field count>, <new virtual count>, <override virtual count>—starts a type CLT_IMPLEMENT_INTERFACE <interface type token>—declares that the type implements an interface type CLT_METHOD <flags>, <impl flags>, <impl hints> [, <overridden method token>]=—declares a method CLT_FIELD_INSTANCE <protection>, <type>, [, <value type token>]—declares an instance field CLT_IMPLEMENT_INTERFACE_METHOD <interface method token>—declares the implementation of an interface method CLT_END_TYPE—ends the byte stream for the current type The byte stream in CTL format can be read by a decoder which reads the opcode and then executes a switch statement to read any additional information associated with a particular opcode and execute appropriate actions. The decoder can build an internal representation of the current type. References to other types, methods and fields may cause recursive invocation of the decoder.

Compact Type Layout

FIG. 1 illustrates a block diagram of a system 100 that includes an encoder that generates a single contiguous stream of data in CTL format for each data type. System 100 may also include a decoder. Information CTL format can be accessed sequentially within a type. Information in CTL format can be randomly accessed at the data type level. The information in CTL format can be compressed using any suitable compression algorithm. Information that is irrelevant to layout decisions and virtual machine data structures can be suppressed. Virtual override information can be pre-computed. Interface implementation information can be pre-computed. The CTL-formatted information can be received by a decoder. The decoder can build an internal representation of the type from the received information. References to other types, methods, and fields may cause recursive invocation of the decoder.

All or portions of system 100 may reside on one or more computers or computing devices such as the computers described below with respect to FIG. 3. System 100 or portions thereof may be provided as a stand-alone system or as a plug-in or add-in. System 100 may execute in whole or in part on a software development computer such as the software development computer described with respect to FIG. 4. All or portions of system 100 may execute within an integrated development environment (IDE) described more fully with respect to FIG. 4. All or portions of system 100 can execute outside an IDE.

System 100 can include one or more computers or computing devices such as but not limited to computing device 102 and computing device 103. One or more of the computers of system 100 can be any computer or computing device including a mobile device, a mobile communication device, a smartphone, a tablet, a desktop computer, a laptop computer, a game box or any other kind of computing device. Computing device 102 and/or computing device 103 may have limited resources such as but not limited to limited battery power, small form factor and/or small screen size. Computing device 102 can include one or more processors such as processor 142, etc., a memory such as memory 144, and a compiler such as intermediate language (IL) compiler 110, IL compiler 110 can include an encoder such as encoder 112 and/or a decoder (not shown). Computing device 103 can include one or more processors such as processor 143, etc., a memory such as memory 145, an encoder (not shown) and/or a decoder such as decoder 114.

Encoder 112 and decoder 114 can exist on the same computer or on different computers. For example, encoder 112 can exist on a software development computer and decoder 114 can exist on a smartphone. In accordance with some aspects of the subject matter disclosed herein, IL compiler 110 can receive metadata 106 and an intermediate language component 108 and can generate information in the compact type layout format described herein (e.g., CTL formatted information 116). The encoder 112 may also produce an abstract representation of code (e.g., abstract code 117). The abstract representation of the code may be in the form of MDIL as described more fully in U.S. patent application Ser. No. 12/762,316 entitled "INTERMEDIATE LANGUAGE SUPPORT FOR CHANGE RESILIENCE" tiled Apr. 17, 2010 and U.S. patent application Ser. No. 12/762,420 entitled "INTERMEDIATE LANGUAGE SUPPORT FOR CHANGE RESILIENCE" filed Apr. 19, 2010. The CTL formatted information 116 can be used to generate one or more data structures such as data structures 118 used in code generation. The abstract representation of the code 117 can be received by decoder 114 to generate native code 120.

In accordance with some aspects of the subject matter disclosed herein, the logical level, the CTL formatted information can comply with the following grammar:

CTL Type=[FormalArguments] StartType {TypeBodyElement} EndType

That is, a CIL Type can comprise an optional Formal Arguments section followed by a mandatory Start Type element followed by zero or more Type Body Elements followed by a mandatory End Type element. Optional sections are denoted by braces ("[ ]") and lists are denoted by curly braces ("{ }"). The optional Formal Arguments section can be present only for generic types and can describe the formal arguments. The syntax of the Formal Arguments section in accordance with some aspects of the subject matter described herein is:

FormalArguments=GenericType(ArgCount) {TypeArgument(ArgToken, ArgFlags)}$^{ArgCount}$ That is, an introductory GenericType element can be associated with an Argument Count parameter followed by one or more Argument Count sections comprising Type Arguments. CTL type element parameters can provide additional information encoded as part of the type elements. This information can be provided during encoding to the binary level encoded as arguments. This information can be supplied during decoding by the binary level decoder to the logical level.

A Type Argument element can be provided for each formal type argument. Each Type Argument element can have an Argument Token parameter that refers back to CIL metadata. Each Type Argument parameter can encode co-variance and contra-variance of type parameters as follows:

| | |
|---|---|
| gpNonVariant = | 0x0000 |
| gpCovariant = | 0x0001 |
| gpContravariant = | 0x0002 |
| gpNoSpecialConstraint = | 0x0003 |

| | |
|---|---|
| gpReferenceTypeConstraint = | 0x0004 |
| gpNotNullableValueTypeConstraint = | 0x0008 |
| gpDefaultConstructorConstraint = | 0x0010 |

The Start Type element can include a base type token which is a type definition, type reference or type specification token specifying the base type the type is derived from. Types can be nested. The Enclosing Type token in accordance with some aspects of the subject matter described herein is a type definition token specifying the type this type is nested in. If the type is not nested, it can have the value nil. The Start Type can also include the number of interfaces the type supports, the number of methods the type includes, the number of field elements the type contains, the number of new virtual methods the type includes and the number of virtual method overrides the type includes. A virtual method override can provide a type-specific implementation of the method.

In accordance with some aspects of the subject matter described herein, after the Start Type element is a list of type body elements that make up the type. The Implement Interface element can describe an interface the type implements. The Implement Interface elements can include type token information. The type token information is a type definition type reference or type specification token specifying the interface type implemented by the data type. Another type body element is a field element that can describe a field that the type has in addition to the fields that the base type has. The field element includes a field token comprising the field definition token that designates the field as CIL metadata.

The method element can describe a method. Traditionally, a virtual method receives a new slot or entry in a virtual table. A method that overrides the virtual method overwrites the entry that is already defined for the base type. Virtual methods encountered in a type are added sequentially to the virtual table for that type so that if a type is changed, the entries in the virtual table can shift. Suppose, for example virtual method X in Type A is associated with slot number 2 in the virtual table. Suppose further that Type B overrides virtual method X and so overwrites the entry number 2. Now suppose Type A is changed: suppose a new virtual method is added to modified Type A so that now virtual method X is associated with slot number 3. Unchanged Type B still overwrite slot number 2, typically causing an error when the virtual method is called. In accordance with aspects of the subject matter described herein, the method element can include an overridden method token that designates any base class method the method being described overrides. This means that should the type change as described above, the correct implementation of the virtual method will still be called.

The Implement Interface method can specify the interface methods implemented by a particular implementation method. The Implement Interface method can associate methods in the data type with definitions of methods in the interface using a metadata token representing the declaration of the interface method and a second metadata token representing a method definition or method reference for the method implementing the interface method. The system can establish mapping tables to enable a caller of the implemented interface method on this type to find the correct implementation of the interface.

The Method Implement method can enable the specification of virtual overrides. The Method Implement method can specify a Declaration Method Token that is a method definition or member reference token designating the overridden method. The Method Implement method can specify an Implementation Method Token that is a method definition or member reference token designating the overriding method.

A variable length encoding scheme can be used to format signed and unsigned numbers into CTL format. The low bits of the first byte of the encoding can specify the number of following bytes as follows:

xxxxxxx0 (i.e., the least significant bit is 0): no more bytes follow. Shift the byte one bit right, and sign or zero extend for signed and unsigned number, respectively.

xxxxxx01: one more byte follows. Build a 16-bit number from the two bytes read (little-endian order), shift it right by 2 bits, then sign or zero extend.

xxxxx011: two more bytes follow, Build a 24-bit number from the three bytes read (little-endian order), shift it right by 3 bits, then sign or zero extend.

xxxx0111: three more bytes follow. Build a 32-bit number from the four bytes read, then sign or zero extend xxxx1111: four more bytes follow. Discard the first byte, build the signed or unsigned number from the following four bytes (again little-endian order).

For example: the unsigned number 12 (0x0000000c) in accordance with the above formatting rules is expressed as the single byte 0x18. The unsigned number 1000 (0x000003e8) is expressed as the two bytes 0xa1, 0x0f.

In accordance with some aspects of the subject matter described herein, type tokens can be encoded as unsigned numbers where the low 2 bits encode the token type as follows:

00: no token
01: typedef token
10: typeref tokens
11: typespec token

The more significant bits can encode the row identifier. For example: the typedef token 0x0200000C can be encoded as the unsigned number 0x00000031, which is expressed as the single byte 0x62.

Similarly to type tokens, method tokens can be encoded as unsigned numbers where the low 2 bits encode the token type:

00: no token
01: methoddef token
10: memberref token
11: methodspec token

The more significant bits can encode the row identifier. For example: the memberref token 0x0a000003 can be encoded as the unsigned number 0x0000000e, which is expressed as the single byte 0x1c.

For the sake of compact encoding, certain values can be kept as default values:

The current methoddef token can be initialized to 0x06000000 when starting to read a type, and incremented before certain CTL opcodes (operation codes) dealing with methods. CTL opcodes can be provided for adjustment. A CTL encoder can emit the methods in token order, so typically only an adjustment before the first method will be needed.

The current fielddef token can be initialized to 0x04000000 and incremented before certain CTL opcodes dealing with fields. CTL opcodes can be provided for adjustment. As a CTL encoder can emit the fields in token order, usually only an adjustment is needed before the first field.

The enclosing type token can be used for nested types. A CTL opcode can be provided to set the enclosing type token.

The current field offset can be initialized to 0xffffffff after each field. CIL opcodes can be provided to set the current field offset in the case of explicit field offsets.

Decoder 114 can receive the CTL data and the abstract representation of the code and from this information can determine offsets and information about which virtual method goes into which virtual table slot. In accordance with aspects of the subject matter described herein, virtual tables for data. types can be constructed efficiently by combining the virtual tables associated with the base type with the virtual tables associated with the derived types. A mechanism can be provided to determine where in the virtual table, a pointer to a method associated with a derived type, is placed. Mapping information that maps a virtual method or a virtual method override to an implementation of an interface can also be provided.

Figure 2:
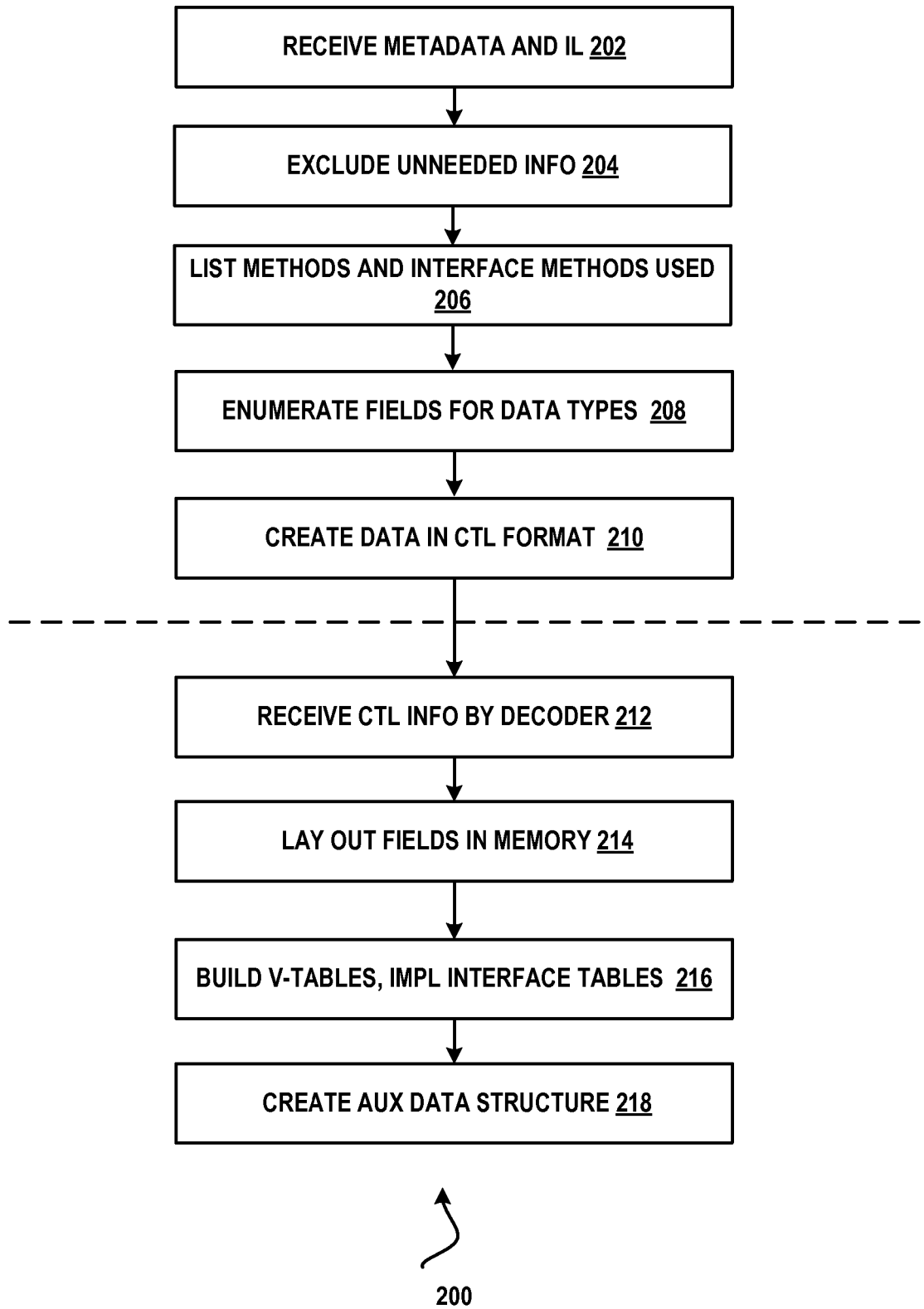
FIG. 2 illustrates an example of a method 200 for generating information in CTL format and using the information in CTL format for code generation in accordance with aspects of the subject matter disclosed herein.

FIG. 2 illustrates a method 200 that can generate a single compact stream of data for data types and in accordance with aspects of the subject matter described herein. The method described in FIG. 2 can be practiced by a system such as but not limited to the one described with respect to FIG. 1. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 an intermediate language representation and metadata can be received by an encoder. In the metadata that is received by the encoder, a field may be represented as a row in a table with columns representing attributes. One column may, for example, represent accessibility. Another column may include an offset into a string pool determining the name of the field. Another column may include a pointer into another table that has a signature that determines the type of the field. Thus two different types that each have a field "address" can share entries in the same table. In the corresponding CTL data there are no references to other tables. Instead the CTL represents the information more directly. For example, type in metadata is determined by the signature. In CTL the type is specified. For example, in the case of a data type of integer (int), the CTL itself specifies "int". Only in the case of an embedded struct is a reference to a table specified in the CTL. If the type is user-defined, the CTL specifies the type token for the other type.

At 204 information that is not needed for layout or virtual table creation can be dropped. For example, field description information is not needed for field layout and can be dropped. For an array, only an object pointer to the array can be kept and any additional information for the array can be dropped. Traditionally, an override method is found by searching through the hierarchy of metadata to find a signature that matches the signature of a method in the base class. This computationally expensive operation is eliminated by generating data in CTL format. In contrast, at operation 206 in the CTL data, the override information is represented more directly by specifying that a particular virtual method overrides a specified method in the base class. Searching is unnecessary. Traditionally, the process of mapping methods in an object to the interface methods which it implements is complicated and requires searching. In contrast, at 206 a method is listed and the interface methods the method implements are listed. At operation 208, fields in a data type can be enumerated.

At operation 210, the information received for each data type can be encoded into single contiguous stream of data in CTL format. At 212 the single contiguous stream of data in CTL format can be received for decoding. At 214 fields in the CTL data can be laid out in memory, each field getting the next offset and each new virtual method getting the next entry in the virtual method table. This processing is straight forward and fast. At 216 data structures including virtual tables and implemented interface tables can be created. A virtual method table for the type can be built from the virtual slot information. The virtual method table can be implemented as an array of pointers where each pointer points to a particular virtual method. The code may make a call to a particular virtual method. The appropriate entry number in the virtual table can be inserted into the machine code so that the virtual method call can be performed correctly.

At 218 structures related to garbage collection can be created. These auxiliary structures can be mapping tables that allow memory used by instances of objects to be reclaimed. Data structures that go into the executable can be created. Information that is used by the code generation process to associate fields and offsets at runtime can be created. All the operations described with respect to FIG. 2 may be executed on the same computer. Alternatively, operations 202 through 210 can be executed on a first computer and operations 212 through 218 can be executed on a second computer as described with respect to FIG. 1. Some aspects of the subject matter described herein may operate in a "cloud" computing environment and/or a "cloud" storage environment.

Example of a Suitable Computing Environment

Figure 3:
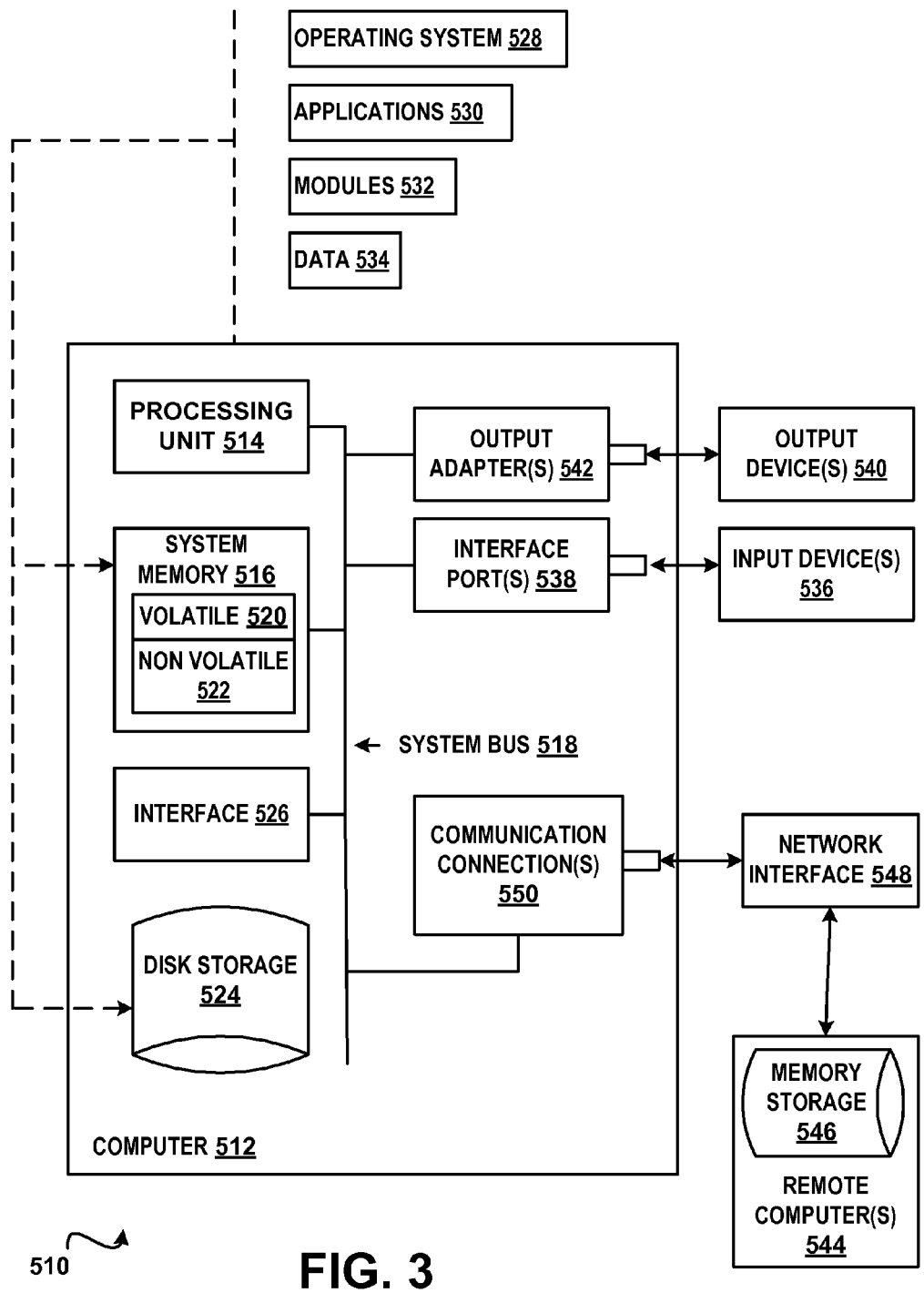
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory.

The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include transitory media such as, but not limited to, communications signals, modulated carrier waves or any other transitory media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating, systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
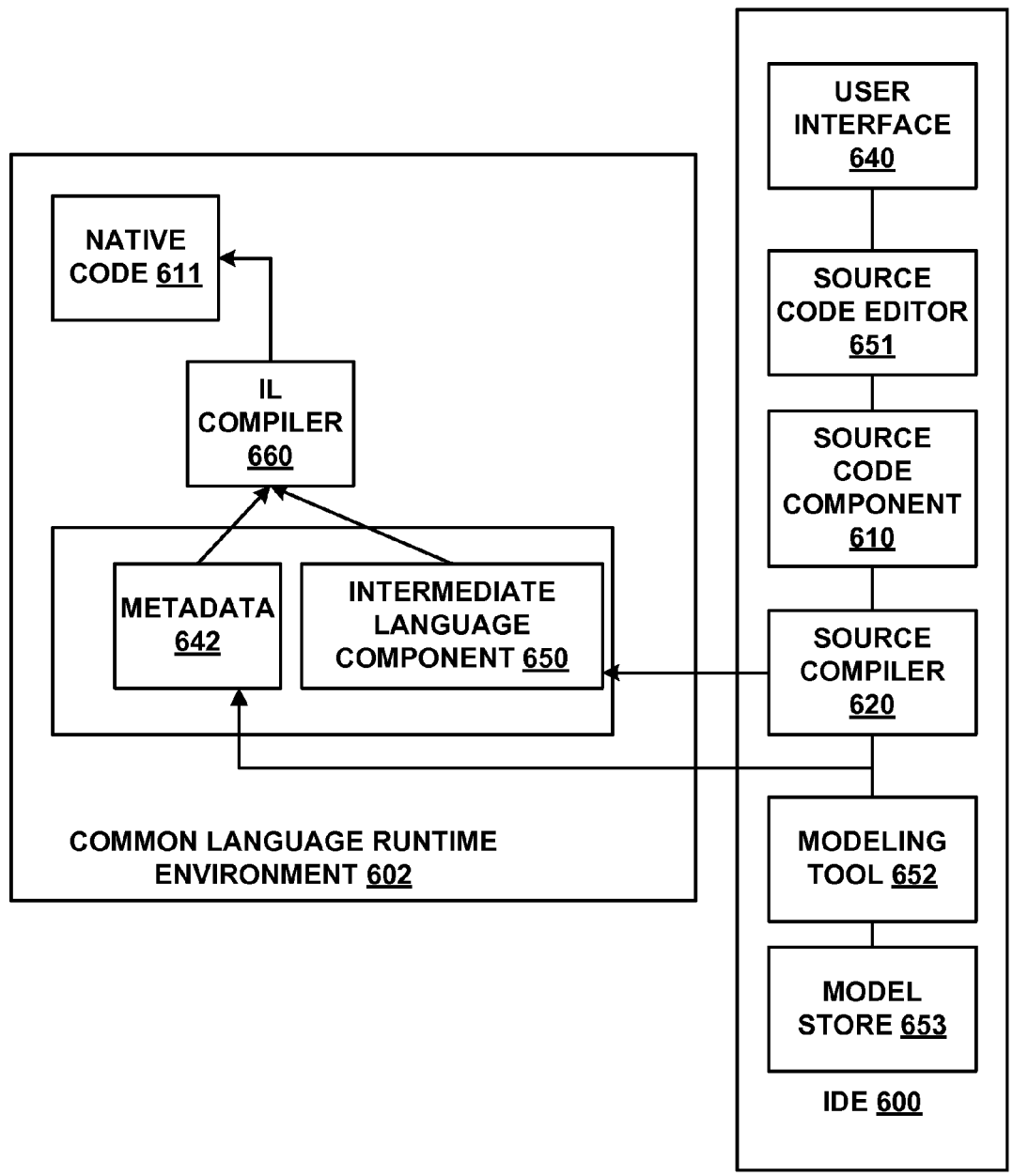
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual_Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or, software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    at least one processor of a computing device;
    a memory of the computing device; and
    an encoder loaded into the memory causing the at least one processor to:
        generate a data stream in compact type layout (CTL) format for a data type using one-byte operation codes, the data stream in CTL format derived from common intermediate language (CIL) metadata; and
        reference types, methods, and fields of the data type by a CIL metadata token.

2. The system of claim 1, wherein the data stream in CTL format comprises a base type token, a count of interfaces used by the data type, a number of methods used by the data type, a number of field elements of the data type, a number of new virtual methods used by the data type and a number of virtual method overrides used by the data type.

3. The system of claim 1, wherein CTL data type information can be randomly accessed.

4. The system of claim 1, wherein the data stream in CTL format comprises pre-compiled virtual override information.

5. The system of claim 1, wherein the data stream in CTL format comprises pre-compiled interface implementation information.

6. The system of claim 1, wherein the data stream in CTL format comprises compressed information.

7. The system of claim 1, wherein a data structure for code generation is created from the data stream in CTL format.

8. A method comprising:
    receiving a data stream in compact type layout (CTL) format by a processor of a computing device, the data stream representing a data type using one-byte operation codes, the data stream for the data type comprising a base type token for the data type, at least one interface used by the data type, at least one method used by the data type, at least one field element of the data type, at least one new virtual method used by the data type and at least one virtual method override used by the data type, the data stream derived from common intermediate language (CIL) metadata; and
    creating at least one data structure used in code generation.

9. The method of claim 8, further comprising calculating an offset for a virtual method.

10. The method of claim 8, further comprising:
    determining a slot into which a pointer to a virtual method used by the data type is placed.

11. The method of claim 8, further comprising:
    mapping a virtual method or a virtual method override to an implementation of an interface.

12. The method of claim 8, further comprising:
    determining an offset in a virtual table for a virtual method.

13. The method of claim 8, wherein the computing device is a smartphone.

14. A device, comprising:
    at least one processor and a memory; the at least one processor configured to:
    generate a data stream in compact type layout (CTL) format for a data type using one-byte operation codes, the data stream in CTL format derived from common intermediate language (CIL) metadata;
    reference types, methods, and fields of the data type by CIL metadata token in the data stream;
    list fields of the data type in the data stream;
    list methods used by the data type in the data stream; and
    list interfaces used by the data type in the data stream.

15. The device of claim 14, wherein the at least one processor is further configured to:
    generate at least one data structure used in code generation from the data stream.

16. The device of claim 15, wherein the at least one processor is further configured to:
    determine a slot of a virtual table associated with the data type into which a pointer to a virtual method used by the data type is placed.

17. The device of claim 15, wherein the at least one processor is further configured to:
    map a virtual method or a virtual method override to an implementation of an interface.

18. The device of claim 15, wherein the at least one processor is further configured to:
    determine an offset for a call to a virtual method used by the data type.

19. The device of claim 15, wherein the at least one processor is further configured to:
    generate a data structure for a program executed on a smartphone.

20. The device of claim 15, wherein the at least one processor is further configured to:
    generate the data stream from CIL metadata, the data stream excluding information in the CIL metadata that is not needed to generate the at least one data structure.

21. A method, comprising:
    receiving, by a processor of a mobile device, a compact data stream representing a first data type, the compact data stream including one or more operation codes used to represent the first data type, the compact data stream derived from an intermediate language metadata;

by the processor, creating a first data structure representing the first data type; and using the first data structure to generate code for the mobile device at runtime.

22. The method of claim 21, wherein the first data structure includes one or more of method tables, method descriptors, field descriptors associated with the first data type.

23. The method of claim 21, wherein using the first data structure to generate code further comprises: performing a Just-In-Time ("JIT") compilation using the first data structure to generate native code.

24. The method of claim 21, wherein using the first data structure to generate code further comprises: generating virtual machine data structures using the first data structure, the virtual machine data structures used to execute the generated code in a virtual machine.

25. The method of claim 21, wherein the compact data stream comprises a base type token for the first data type, at least one interface used by the first data type, at least one method used by the first data type, at least one field element of the first data type, at least one new virtual method used by the first data type, and at least one virtual method override used by the first data type.

26. The method of claim 21, further comprising: creating auxiliary data structures for use by a garbage collector to reclaim memory space used by instances of objects associated with the first data type.

27. The method of claim 21, wherein the one or more operation codes reference one or more types, methods, and fields of the first data type.

28. A system comprising:
at least one processor of a computing device;
a memory of the computing device; and
an encoder loaded into the memory causing the at least one processor to:
generate a compressed data stream for a first data type using one or more operation codes, the compressed data stream derived from intermediate language metadata; and
reference types, methods, and fields of the first data type through a token, the token formatted as a signed or unsigned number comprising one or more bytes of data.

29. The system of claim 28, wherein the compressed data stream comprises a base type token, a count of interfaces used by the data type, a number of methods used by the data type, a number of field elements of the data type, a number of new virtual methods used by the data type and a number of virtual method overrides used by the data type.

30. The system of claim 28, wherein the compressed data stream can be randomly accessed.

31. The system of claim 28, wherein the compressed data stream comprises pre-compiled virtual override information.

32. The system of claim 28, wherein the compressed data stream comprises pre-compiled interface implementation information.

33. A mobile device comprising a memory and at least one processor configured to:
receive a compact data stream representing a first data type, the compact data stream including one or more operation codes used to represent the first data type, the compact data stream derived from an intermediate language metadata;
create a first data structure representing the first data type; and
use the first data structure to generate code for the mobile device at runtime.

34. The device of claim 33, wherein using the first data structure to generate code further comprises: perform a Just-In-Time ("JIT") compilation using the first data structure to generate native code.

35. The device of claim 33, wherein using the first data structure to generate code further comprises: generate virtual machine data structures using the first data structure, the virtual machine data structures used to execute the generated code in a virtual machine.

36. The device of claim 33, wherein the compact data stream comprises a base type token for the first data type, at least one interface used by the first data type, at least one method used by the first data type, at least one field element of the first data type, at least one new virtual method used by the first data type, and at least one virtual method override used by the first data type.

37. The device of claim 33, wherein the at least one processor is further configured to: create auxiliary data structures for use by a garbage collector to reclaim memory space used by instances of objects associated with the first data type.

38. A mobile device comprising:
at least one processor;
at least one memory; and
a decoder loaded into the memory causing the at least one processor to:
receive a compact data stream representing a first data type, the compact data stream including one or more operation codes used to represent the first data type, the compact data stream derived from an intermediate language metadata;
decode the operation codes to generate at least one first data structure used to represent the first data type; and
generate code for the mobile device to execute at runtime.

39. The mobile device of claim 38, wherein decode the operation codes further comprises: build a virtual method table for the first data type, the virtual method table containing a pointer to each virtual method associated with the first data type.

40. The mobile device of claim 38, wherein decode the operation codes further comprises: create auxiliary data structures for use in reclaiming memory used by instances of objects.

41. The mobile device of claim 38, wherein decode the operation codes further comprises: lay out in the memory, fields associated with the first data type.

* * * * *